United States Patent
Yadav et al.

(10) Patent No.: US 12,026,232 B2
(45) Date of Patent: Jul. 2, 2024

(54) SYSTEM AND METHOD FOR DIGITALLY FINGERPRINTING PHISHING ACTORS

(71) Applicant: ROYAL BANK OF CANADA, Toronto (CA)

(72) Inventors: Vikash Yadav, Toronto (CA); Jamie Gamble, Toronto (CA); Ilya Kolmanovich, Guelph (CA); Cormac O'Keeffe, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 674 days.

(21) Appl. No.: 17/100,226

(22) Filed: Nov. 20, 2020

(65) Prior Publication Data
US 2021/0160280 A1  May 27, 2021

Related U.S. Application Data

(60) Provisional application No. 62/939,208, filed on Nov. 22, 2019.

(51) Int. Cl.
| | |
|---|---|
| *G06F 16/00* | (2019.01) |
| *G06F 18/22* | (2023.01) |
| *G06F 18/2413* | (2023.01) |
| *H04L 9/40* | (2022.01) |

(52) U.S. Cl.
CPC ........ *G06F 18/22* (2023.01); *G06F 18/24137* (2023.01); *H04L 63/00* (2013.01)

(58) Field of Classification Search
CPC .............. G06F 16/285; G06F 16/9024; G06F 16/90335; G06F 16/904; G06F 2111/10; G06F 30/20; G06F 16/212; G06F 16/278; G06F 16/906; G06F 16/9536; G06F 21/32; G06F 3/011; G06F 3/015; G06F 3/017; G06F 3/0482; G06F 3/04842; G06F 3/0485; G06F 3/0488; G06F 16/951; G06F 16/9538; G06F 16/9535; G06F 40/134; G06F 16/24578; G06F 18/22; G06F 40/295; G06F 16/583; G06F 16/5854; G06F 16/957; G06F 40/169; G06F 9/451; G06F 16/156; G06F 16/2228

See application file for complete search history.

(56) References Cited

U.S. PATENT DOCUMENTS

| | | | |
|---|---|---|---|
| 2016/0048556 A1* | 2/2016 | Kelly | G06Q 10/10 707/767 |
| 2017/0053208 A1* | 2/2017 | Krishnamurthy | G06N 5/022 |
| 2017/0193568 A1* | 7/2017 | Pattabiraman | G06Q 30/0222 |

* cited by examiner

*Primary Examiner* — Shyue Jiunn Hwa
(74) *Attorney, Agent, or Firm* — Norton Rose Fulbright Canada LLP

(57) ABSTRACT

Websites, having associated features, are clustered by filtering entries that may be legitimate, determining feature similarity scores between the website features, and generating an aggregated similarity matrix containing website similarity scores between the websites. Websites are clustered into clusters or groups, based in part on the aggregated similarity matrix. Each cluster is identified by a cluster identifier and represents a centroid website and other websites at a normalized similarity score from the centroid. It is determined for each website whether the normalized similarity score is less than a threshold, and if so is identified as weakly-similar. Above the threshold, the website is labelled with the cluster identifier. Further clustering and thresholding is performed on the weakly-similar websites into additional clusters.

20 Claims, 12 Drawing Sheets

| similarity_value | url | creation_date |
|---|---|---|
| 1 | http://fido.refund-245.info/fido_deposit_8459/banks/RBC/details.php | 2019-11-03 |
| 0.829626204 | http://fido.refund-873.info/fido_deposit_8459/banks/RBC/ | 2019-11-03 |

FIG. 3

| similarity_value | url | creation_date | registrant_info | registrant_phone |
|---|---|---|---|---|
| 0.851138867 | http://rbz20.com/banks/RBC/ | 2019-11-05 | 96 mowat ave., m4k 3k1, | 14165385467 |
| 0.859812434 | http://rbza.com/banks/RBC/ | 2019-11-08 | 96 mowat ave., m4k 3k1, | 14165385467 |
| 0.702463948 | http://rcbank.com/jb/sirecting/www1.royalbank.com/ | 2019-11-08 | 96 mowat ave., m4k 3k1, | 14165385467 |
| 0.845152261 | http://rbz01.com/banks/RBC/ | 2019-11-08 | 96 mowat ave., m4k 3k1, | 14165385467 |
| 0.799410592 | http://rcop20.com/banks/RBC/ | 2019-11-05 | 96 mowat ave., m4k 3k1, | 14165385467 |
| 0.784698865 | http://rcp0.net/banks/RBC/ | 2019-11-06 | 96 mowat ave., m4k 3k1, | 14165385467 |
| 0.707783395 | http://rcr-8840.com/ | 2019-11-07 | 96 mowat ave., m4k 3k1, | 14165385467 |
| 0.643886229 | http://rcp0.net/ | 2019-11-06 | 96 mowat ave., m4k 3k1, | 14165385467 |
| 0.723244814 | http://rba1.com/banks/RBC/ | 2019-11-06 | 96 mowat ave., m4k 3k1, | 14165385467 |
| 0.748014255 | https://rcinstantpf.com/vdn357/secure/sirecting/www1.royalbank.com/allo.php | 2019-11-11 | 96 mowat ave., m4k 3k1, | 14165385467 |
| 0.717393992 | | | | |

FIG. 5

SYSTEM AND METHOD FOR DIGITALLY FINGERPRINTING PHISHING ACTORS

CROSS-REFERENCE TO RELATED APPLICATION(S)

This application claims priority from U.S. Provisional Patent Application No. 62/939,208, filed Nov. 22, 2019, the entire contents of which are hereby incorporated by reference herein.

FIELD

This disclosure relates to digital fingerprinting techniques.

BACKGROUND

Attackers or threat actors use phishing sites to lure user's such as customers of a financial institution such as a bank into entering their credentials, such as Online Banking (OLB) credentials, for a legitimate website to obtain access to the legitimate website, and can be used for nefarious purposes such as stealing money from the user's account. A single attacker might create multiple phishing sites to increase their chance of successfully phishing a user's credentials.

SUMMARY

According to an aspect, there is provided a computer-implemented method for clustering websites, the method comprising: receiving a list of websites, each entry for a website in the list including associated features of the website; generating a filtered list of websites by removing entries from the list of websites based at least in part on the associated features; determining feature similarity scores between features of the filtered list to form a feature similarity matrix; generating an aggregated similarity matrix containing website similarity scores between websites of the filtered list based on the feature similarity matrix; clustering websites in the filtered list into clusters, based at least in part on the aggregated similarity matrix, each cluster identified by a cluster identifier and representing one of the websites as a centroid and one or more of the websites at a normalized similarity score distance from the centroid; for each of the websites: determining whether the normalized similarity score between the website and the centroid is less than a threshold; identifying the website as a weakly-similar website when the normalized similarity score between the website and the centroid is less than the threshold; and labeling the website with the cluster identifier when the normalized similarity score between the website and the centroid is greater than or equal than the threshold; clustering the weakly-similar websites into additional clusters, based at least in part on the aggregated similarity matrix, each additional cluster of weakly-similar websites identified by an additional cluster identifier and representing one of the weakly-similar websites as an additional centroid and one or more of the weakly-similar websites at a normalized similarity score distance from the additional centroid; and for each of the weakly-similar websites: determining whether the normalized similarity score distance between the weakly-similar website and the additional centroid is less than the threshold; identifying the weakly-similar website as noise when the normalized similarity score between the weakly-similar website and the additional centroid is less than the threshold; and labeling the weakly-similar website with the additional cluster identifier when the normalized similarity score between the weakly-similar website and the additional centroid is greater than or equal than the threshold.

In some embodiments, the clustering is performed based on affinity propagation clustering.

In some embodiments, the affinity propagation clustering represents each website with a data point, and a message passing procedure is performed between the data points based on relative attractiveness between data points until a consensus is reached.

In some embodiments, the associated features for a website include a URL.

In some embodiments, the method further comprises generating additional features for a website including a domain, a path and a filename based at least in part on the URL.

In some embodiments, the associated features for a website include a creation date for the website.

In some embodiments, the filtered list is generated by removing entries from the list of websites having a creation date that is greater than 365 days from a present date.

In some embodiments, the associated features for a website include metadata for the website.

In some embodiments, the associated features include one or more of a URL, a registrant name, a registrant phone number, a registrant email, a registrant address, or a registrant organisation.

In some embodiments, the associated features include categorical features, and the feature similarity scores are based at least in part on an edit distance between the categorical features that is normalized by a length of a larger string.

In some embodiments, the associated features include date features, and the feature similarity scores are based at least in part on a difference in number of days between the date features.

In some embodiments, the associated features include numerical features, and the feature similarity scores are based at least in part on an absolute difference between the numerical features normalized using a standard scaler.

In some embodiments, the website similarity scores are based at least in part on a weighted sum of sorted feature similarity scores.

In some embodiments, the method further comprises removing predefined features from the filtered list.

In some embodiments, the method further comprises selecting a website from a cluster identifier, generating fabricated credentials, and submitting the fabricated credentials to the selected website.

In some embodiments, the method further comprises detecting a sign-event attempt to a legitimate website using the fabricated credentials.

In some embodiments, the method further comprises determining an attacker identifier of the sign-in attempt and block access of sign-in attempts associated with the identifier to the legitimate website.

In some embodiments, the method further comprises generating an attacker profile based at least in part on the cluster identifier of the selected website, the attacker identifier and phishing kit information associated with a URL of the selected website.

According to another aspect, there is provided a computer system comprising: a processor; and a memory in communication with the processor, the memory storing instructions that, when executed by the processor cause the processor to perform a method as disclosed herein.

A non-transitory computer-readable medium having computer executable instructions stored thereon for execution by one or more computing devices, that when executed perform a method as disclosed herein.

Other features will become apparent from the drawings in conjunction with the following description.

BRIEF DESCRIPTION OF DRAWINGS

In the figures which illustrate example embodiments,

FIG. 3 illustrates an example array of similarity score values, according to an embodiment;

FIG. 5 illustrates an example array of similarity score values, according to an embodiment;

DETAILED DESCRIPTION

Entities, such as attackers or threat actors, may create multiple phishing sites in an attempt to steal account or sign-in information, by spoofing a legitimate website to which an unsuspecting user enters their sensitive information.

To determine a digital fingerprint of such attackers, one technique is to purposely submit fabricated or fake credentials to a phishing website, such that when an attacker tries to login to the legitimate website using the fake credentials, the attacker's digital information, such as source device, can be identified and blocked from future access attempts.

A challenge in submitting fake credentials to phishing websites that target customers of an organization is to avoid raising any suspicion of the attackers regarding potential monitoring of their activity. For example, if an attacker generates multiple phishing websites, and fake credentials are submitted to all of the phishing websites, the attacker may be tipped off that the fake credentials do not belong to an actual target, and may raise suspicion of the attackers regarding potential monitoring of their behaviour.

Thus, it may be desirable to group phishing websites together that are suspected as originating from the same attacker, and submit fake credentials to only one of the phishing websites out of the multiple phishing websites that are suspected to have been created by a single attacker or related to the same source.

Systems and methods disclosed herein may provide an improved approach of submitting fake credentials to phishing websites that target users such as banking customers. In particular, multiple websites may be digitally fingerprinted or profiled and grouped together to identify a common entity, such as an attacker, using techniques described herein.

Conveniently, purposefully submitting fake credentials, such as submitting to only one of multiple commonly-held phishing websites, may allow for digital fingerprinting of the attackers while avoiding raising suspicion of the attackers.

Embodiments disclosed herein may group various websites based on a number of features, in an example, website metadata. Such features can include both those which are visible for website visitors and others that are hidden from website visitors. Hidden features may be obtained by further look-up, API-queries, or research.

Multiple websites may have different or similar interfaces, different or similar domain names, and different or similar URL paths. By looking at features described herein and applying an unsupervised clustering technique on the features, it may be possible to group websites together and identify with a high likelihood a single website owner or source for a group of different websites.

Embodiments disclosed herein may thus address a technical problem in cyber security of identifying associated websites, for example, as associated with a single entity, and tracking digital credentials.

Figure 1:
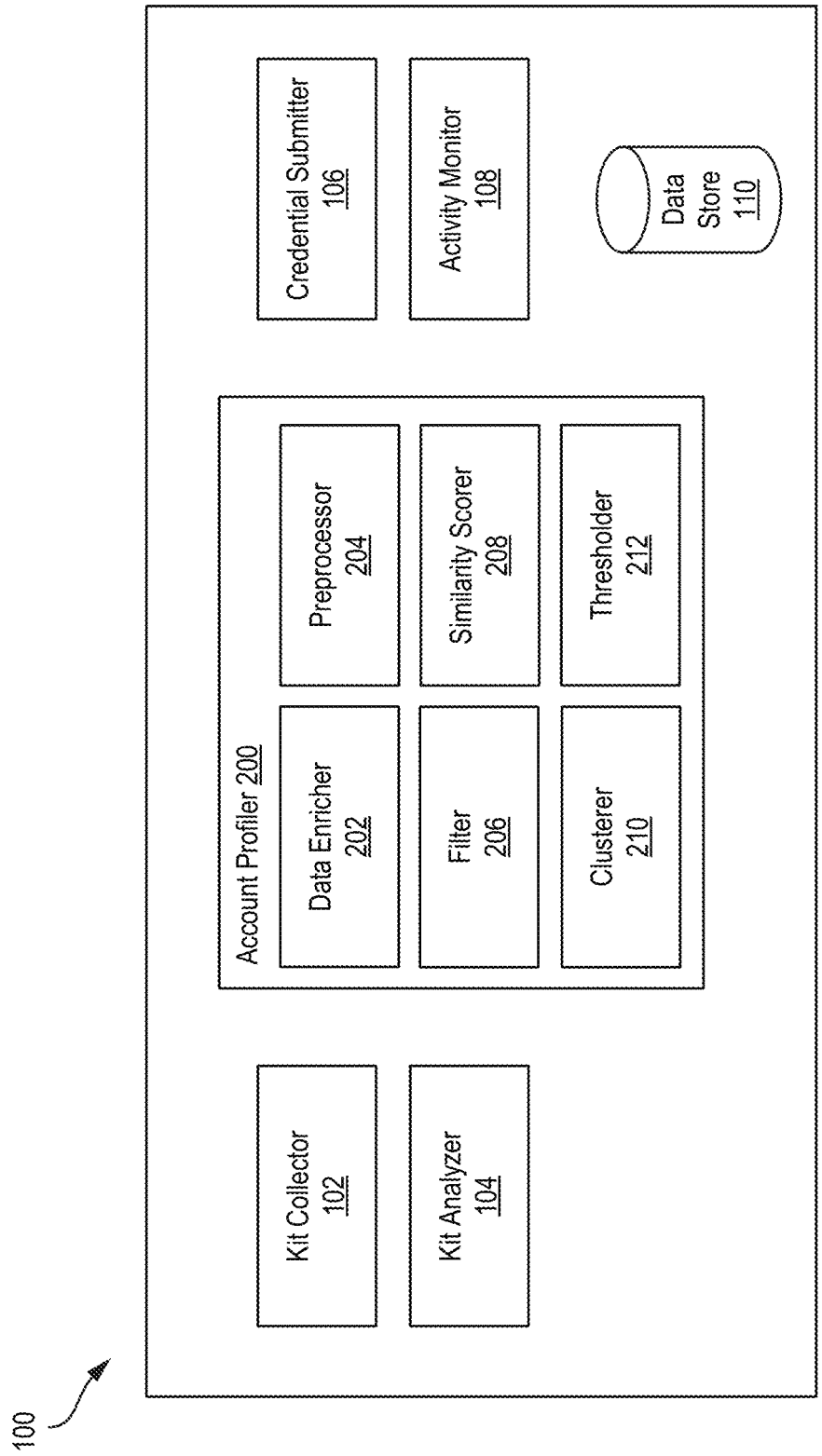
FIG. 1 is a schematic of a digital fingerprinting system, according embodiment.

FIG. 1 illustrates a digital fingerprinting system 100, in an embodiment.

Digital fingerprinting system 100 can include a kit collector 102, a kit analyzer 104, an account profiler 200, a credential submitter 106, an activity monitor 108, and a data store 110 as described in further detail below.

Account profiler 200 can include a data enricher 202, a preprocessor 204, a filter 206, a similarity scorer 208, a clusterer 210 and a thresholder 212, to profile similarities and cluster similar accounts such as websites.

Data store 110 can be configured to store input data, such as URL information on websites and related features, as well as data used and generated by digital fingerprinting system 100 and as disclosed herein.

Figure 2:
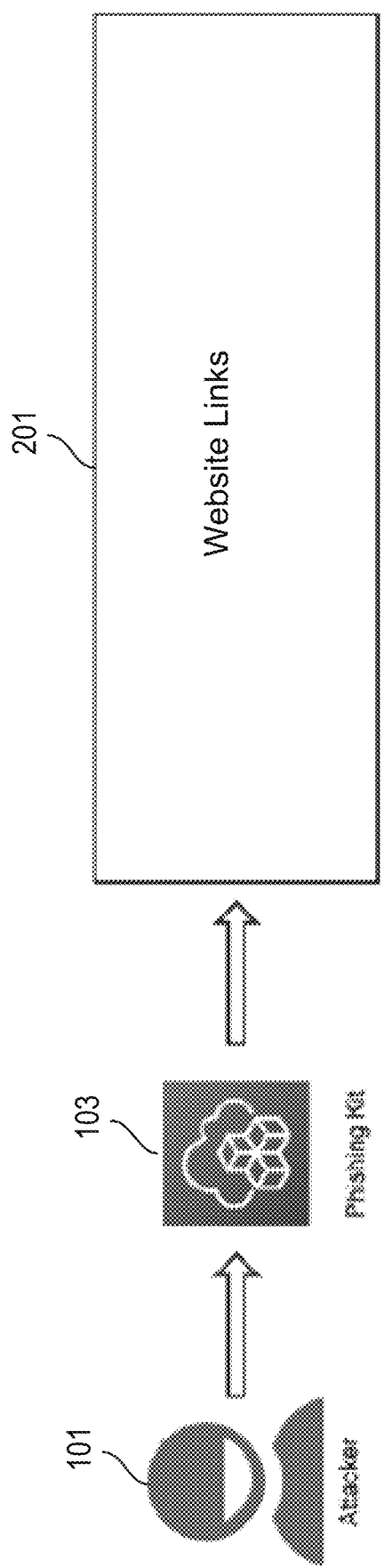
FIG. 2 is a flow chart of an entity generating phishing sites using a phishing kit, according to an embodiment.

FIG. 2 is a flow chart of an entity 101, such as an attacker or threat actor, using a phishing kit 103 to generate multiple phishing websites 201, according to an embodiment, to increase chance of entity 101 successfully phishing a user's credentials.

Phishing kit information can be collected through information collected through a third party vendor (for example, RSA) and using kit collector 102 and kit analyzer 104.

In some embodiments, it may be desirable to obtain information about a phishing kit 103 that was used to create a particular URL that is being used for phishing purposes.

Kit collector 102 can receive phishing kits 103 based on URLs 221 for websites 201 from a third party vendor such as RSA.

In some embodiments, kit collector 102 can be an in-house tool to collect phishing kits 103 used by threat actors to create phishing websites. In some embodiments, kit collector 102 scans URLs of websites identified as phishing website, for open directories and looks for files such as compressed .zip files, as phishing sites may leave leftover phishing kits as a .zip file. Kit collector 102 can download the .zip file for kit analyzer 104 to analyze and extract relevant information from.

Kit analyzer 104 can be used statically analyze phishing kits 103 to extract relevant information and store information in a phishing kit database 114, which can be a relational database, and in an example, can be stored in data store 110.

Kit analyzer 104 can extract information about websites 201 from a phishing kit 103, such as the structure of the phishing website, number of pages the website has, the questions the threat actor is targeting from a user, such as username and password, verification questions, requested personal information such as personal email account, social insurance, license, variety of info threat actor aiming to collect, providing another dimension to learning about the threat actor.

In some embodiments, kit analyzer 104 may have the ability to recover an email of a threat actor available within a phishing kit 103.

Kit analyzer 104 can extract information, including that listed below, and store it in phishing kit database 114: Kit ID—name of the phishing kit zip file; emails—all the emails found in various script files comprising of phishing kit, which may including recovering an email of the attacker; PVQs (Personal Verification Question)—PVQ questions targeted by attackers to login to a target such as online banking; PI (Personal Information)—list of personal information questions targeted by attackers to successfully verify customer's identity, for example, through telephone banking, such as social insurance number, driver's license number; number of pages—number of pages of the phishing kit; filenames—file name for HTML and PHP web pages; dir_path—file path, which can be used to understand the directory structure of the phishing kit; page flow—sequence of pages encountered by a client interacting with phishing websites created using the kit; other information—external resources such as images, JavaScript, and the like.

In some embodiments, kit analyzer 104 has an API that can be queried or called to link a URL 221 for a phishing website with associated phishing kit 103 and return information stored in the phishing kit database. The API can take input, for example, a URL or an email address.

In some embodiments, to search by URL, kit analyzer 104 can take a URL as input. In an example, kit analyzer 104 takes a URL such as http://google.com/folder1/folder2/a.php and breaks it down into three parts: domain [google.com], directories [folder1, folder2], and filename [a.php]. The domain may be ignored, and the directory matched against a "dir_path" column and file name will be matched against a "file_name" column in the phishing kit database. The API can return information stored in the phishing kit database for one or more matching phishing kits 103.

In some embodiments, to search by email, kit analyzer 104 can take an email as input, to match against an email column in the phishing kit database. The API can return information stored in the phishing kit database for one or more matching phishing kits 103 that have used this email to send stolen credentials.

Kit analyzer 104 may thus be able to determine questions (such as PI or PVQ) asked by an attacker or threat actor. With such information, it may thus be possible to modify security protocols, such as verification questions, to improve security of access to a user's account.

Conveniently, determining questions such as PI or PVQ questions can be used to perform post-analysis on which phishing kits 103 are popular and more likely to be used by hacker, and what kinds of questions are being asked in that kit. With knowledge of the questions, it can be determined what questions are most likely to be targeted by that actor, such as driver's license number, social insurance number, and the like. With that information, it may be possible to design a security strategy for an organization on how to validate a user's identity. By revealing find out what PI questions are most likely to be asked, it may be possible to change strategy for certain functionality such as telephone banking and ask different questions.

In some embodiments, account profiler 200 uses a machine learning technique to generate a model, using unsupervised clustering techniques to group website URLs based on features such as URL metadata features.

Account profiler 200 may output groups or clusters, each group representing a list of websites that were created by the same person or entity. For every data point, the model outputs a cluster identifier as well as a probability score indicating its similarity to the cluster centroid. In some embodiments, an affinity propagation clustering algorithm is used to group URLs based on metadata information such that URLs with similar metadata information or domain name pattern are grouped together.

As illustrated in FIG. 1, account profiler 200 can include data enricher 202 to obtain further features or metadata related to a website, preprocessor 204 to format website features and information for further processing, filter 206 to remove from further analysis websites of less relevance, similarity scorer 208 to determine similarity score values between features and websites, clusterer 210 to cluster similar websites into clusters or groups, and thresholder 212 to separate websites that do not meet a similarity threshold. Each will be described in further detail below.

Digital fingerprinting system 100 may obtain data from multiple sources.

Input to account profiler 200 can be a list of websites 201 of interest (for example, flagged as phishing websites), that can be identified, in an example, by URLs 221, which can be provided by an external vendor, such as RSA, or collected internally in an organization. Information relating to websites 201 can be enriched with multiple vendor based APIs to obtain metadata information related to a URL 221 using data enricher 102.

In some embodiments, websites 201 can be identified by their URL 221 using a third party vendor, such as RSA, and can be consumed through an API. In some embodiments, websites 201 can be collected internally by an organization or within system 100, such as from web server logs.

In some embodiments, website 201 data such as URLs 221 and other features 211, including a list of phishing URLs, may be received by digital fingerprinting system 100, extracted from the following sources: a vendor such as RSA Security, by using an API, and Apache web-logs of an organization or online banking. Internal process of obtaining the logs and parsing specific URLs based on known patterns of phishing kits.

Each website 201 and its associated features 211 (such as URL 221) can be represented as a data point 301.

In some embodiments, data enricher 202 may utilize a vendor API to obtain features 211 of websites 201, in particular, related to domain registration information or based on the associated URL 221. An API call may be executed for each website 201, and the response stored in a list of features, for example, in data store 110.

Data enricher 202 may thus perform an enrichment function to receive metadata information related to websites 201, and in an example, obtain that information from a third party vendor related to features 211 of websites 201.

Features 211 of a website 201 can include, but are not limited to, information such as: domain name; URLs 221 (one or more URLs of pages of the website at a domain); registrant information (entity that registers the domain), such as registrant name (person whose name is being used for registering the domain), registrant phone number, registrant email, registrant address information, and registrant organisation.

Additional features 211 of websites 201, for example obtained by data enricher 102, can include: registrar information (domain name provider); domain hosting or whois server (domain hosting service provider); server name (server where domain is hosted); admin name (administrator of the website, can be the same as registrant name or may contain a generic value); creation date (date on which website was created); updated date (last date on which website was modified); and server IP address (IP address of server where domain is registered).

Other suitable features 211 are also contemplated, and can include but are not limited to content of a website, metadata of a website, layout or formatting of a website, interface features, and the like.

Preprocessor 204 may perform data cleaning and transformation, for example, by removing values or features 211 from data points 301 such as "REDACTED FOR PRIVACY", "Privacy Protect", "LLC", and the like that may not be relevant to a similarity analysis. Certain features 211 may be predefined as less relevant and for removal by preprocessor 204.

Additionally, features 211 may be split into further features 211. For example, a URL 221 may be split into further particularized features representing (i) domain name or host, (ii) domain path and (iii) page name. For example, a URL "www.google.com/directory/maps/india/index.html" can be split into individual features 211 for the domain "maps.google.com", the path "/maps/india", and the page name "index.html".

In some embodiments, a domain host feature 211 can be split into (i) subdomain, (ii) domain, and (iii) top-level domain (TLD). For example, "maps. google.com" can be split into individual features for "maps", "google" and "com".

In some embodiments, only domain-level features are retained for performing similarity scoring by similarity scorer 208 and clustering by clustered 210, for example, actual domain name "maps.google.com" may be the only feature 211 used.

Filter 206 can filter data points 301 for websites 201 that were created beyond a time threshold, for example, more than a year ago, which may be legitimate websites hijacked by attacker to serve phishing code. Discarded data points 301 can be labeled with a suitable label such as "−1 cluster id" to indicate that it is a noise data point. These data points 301 are excluded from further processing and analysis, such as similarity scoring and clustering, as certain of the features 211 associated with the discarded data points 301 may not provide any meaningful information.

In some embodiments, filter 206 performs noise reduction by way of a heuristic test, which may have a created date older than a threshold, such as a year, to identify one or more legitimate websites hacked by an attacker to host a phishing script. Filter 206 can filter such URLs, as the metadata features may not provide relevant information about an attacker.

Other suitable filtering techniques may be implemented to omit websites that are likely legitimate from remaining analysis.

In some embodiments, similarity scorer 208 generates a feature structure. For the data points 301, such as in a filtered list of websites, remaining following filtering by filter 206, in an example, N number of data points 301 in a data set, each data point 301 representing a website 201 and associated features 211, such as URL 221, a similarity matrix is computed using features 211. Features can include one or more of the following: URL 221, divided into four parts (Subdomain, Domain, Top Level Domain, URL path); registrant name; registrant phone number; registrant email address; registrant address information; registrant organisation; website creation date; and other suitable metadata.

Other suitable combinations of features 211, as disclosed herein, may be used.

A similarity matrix may be an N*N symmetric matrix which stores a measure of similarity between data points 301, where N is the number of input data points 301.

Similarity scorer 208 can be configured to calculate a three-dimensional similarity matrix M containing similarity scores with dimensions N×N×number_of_features, formed, in an example, of two-dimensional N×number_of_features arrays 218. All of data points 301 can be compared with each other to find their similarity score across various features 211.

In some embodiments, a similarity score can be determined between categorical features based on an Edit Distance that is normalized by length of the larger string.

In some embodiments, a similarity score can be determined between date features based on a difference in number of days.

In some embodiments, a similarity score can be determined between numerical features based on absolute difference and normalized using standard scaler.

In some embodiments, a similarity score $\hat{S}$ in a similarity matrix M can be determined by:

$$\hat{S}_{ijk} = f(D_{ik}, D_{jk})^2$$

where i and j are the index of data points 301 compared and k is the feature 211 index. In some embodiments, function $f$ is a Levenshtein Edit Distance for categorical features, and a difference between the values for continuous and date features (in number of days), resulting in a three-dimensional matrix M having dimensions N×N×number_of_features.

Values in the third dimension of M may be summed to a single number.

Similarity score values $\hat{S}$ can be decrementally sorted in third dimension for each N×N two-dimensional entries, such that higher similarity features are followed by less similar feature values. In some embodiments, features 211 such as domain_path and TLD feature similarity are excepted, and are intentionally kept after domain feature similarity.

In some embodiments, a Sort function, $\hat{S}_{ij} = \text{Sort}(\hat{S}_{ij})$, sorts the k values at index i and j in decreasing order. Reordering feature similarity in decreasing order leads to assigning a higher weight for more similar features in the weighted sum being computed in the next step. This may be done to dynamically assign feature importance for the data points being compared.

Following sorting, a weighted sum of similarity scores can be determined, where weight can be a value index.

In some embodiments, similarity score between data points 301, indexed i and j, can be determined based on a weighted sum of individual feature similarity:

$$S_{ij} = -\sum \frac{1}{k} \hat{S}_{ij}.$$

In some embodiments, letting V=M[0,1,:] be a number_of_feature-dimensional vector at index [0,1] matrix M, a weighted sum can be $$\sum_{i \in 0\ldots|V|} \log(V[i]) * \frac{1}{i+1}.$$

The result is an N×N aggregated similarity matrix M', a two-dimensional representation of similarity between each data point 301 to each other data point 301 for N×N data points 301.

In some embodiments, other suitable similarity calculations may be implemented.

Generated similarity score matrices may be stored in data store 110.

FIG. 3 illustrates an example of a two-dimensional N×number_of_features array 218 of similarity score values between data points 301 and listing associated features 211 (including URLs 221), generated by similar scorer 208 for a campaign trend "Fido" telco company is illustrated in FIG. 3.

Figure 4:
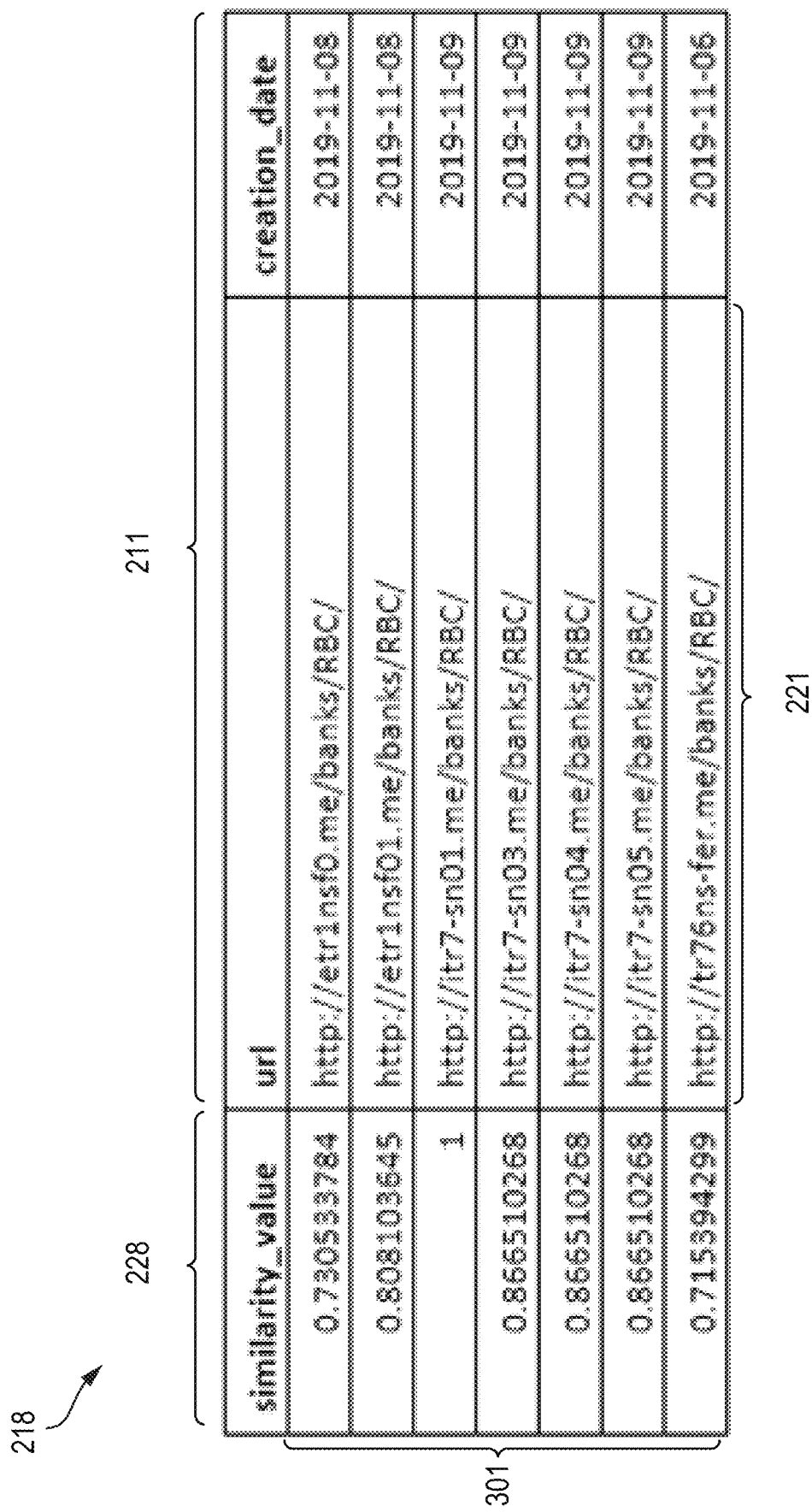
FIG. 4 illustrates an example array of similarity score values, according to an embodiment.

FIG. 4 illustrates an example of a two-dimensional N×number_of_features array 218 of similarity score values between data points 301 and listing associated features 211 (including URLs 221), generated by similar scorer 208 for a campaign trend "Interac" electronic transfer financial services is illustrated in FIG. 4.

FIG. 5 illustrates an example of a two-dimensional N×number_of_features array 218 of similarity score values between data points 301 and listing associated features 211 (including URLs 221), generated by similar scorer 208 for an attacker that reuses addresses and phone numbers is illustrated in FIG. 5.

Similarity matrix M' generated by similarity scorer 208 can be input to clusterer 210. In some embodiments, clusterer 210 is implemented as an affinity propagation clustering algorithm, which clusters data points by sending messages between pairs of nodes until convergence.

Clusterer 210 generates a cluster identifier for each data point 301, which represents which cluster 602 a data point 301 is in. Data points 301 in the same cluster 602 will have the same cluster identifier. Clusterer 201 also determines a centroid 612 data point 301 of each cluster 602, and can output a similarity score of each data point 301 to the centroid 612 in its cluster 602.

An affinity propagation algorithm can be applied to cluster N data points 301 in different groups or clusters 602. In some embodiments, each data point 301 sends messages to all other points 301 informing its target data points 301 of each target's relative attractiveness to the sender. Each target data point 301 then responds to all sender data points 301 with a reply informing each sender data point 301 of its availability to associate with the sender data point 301, given the attractiveness of the messages that it has received from all other sender data points 301. Sender data points 301 reply to the target data points 301 with messages informing each target data points 301 of the target data point's 301 revised relative attractiveness to the sender data point 301, given the availability messages it has received from all target data points 301. The message-passing procedure proceeds until a consensus is reached. Once the sender data point 301 is associated with one of its target data points 301, that target data point 301 becomes an exemplar or centroid 612 for that sender data point 301. All data points 301 with the same centroid 612 are placed in the same cluster 602. Attractiveness between data points 301 can be represented by a similarity score calculated by similarity scorer 208; less similar data points 301 will not get clustered together, and higher similarity data points 301 end up in same cluster 602.

Figure 6:
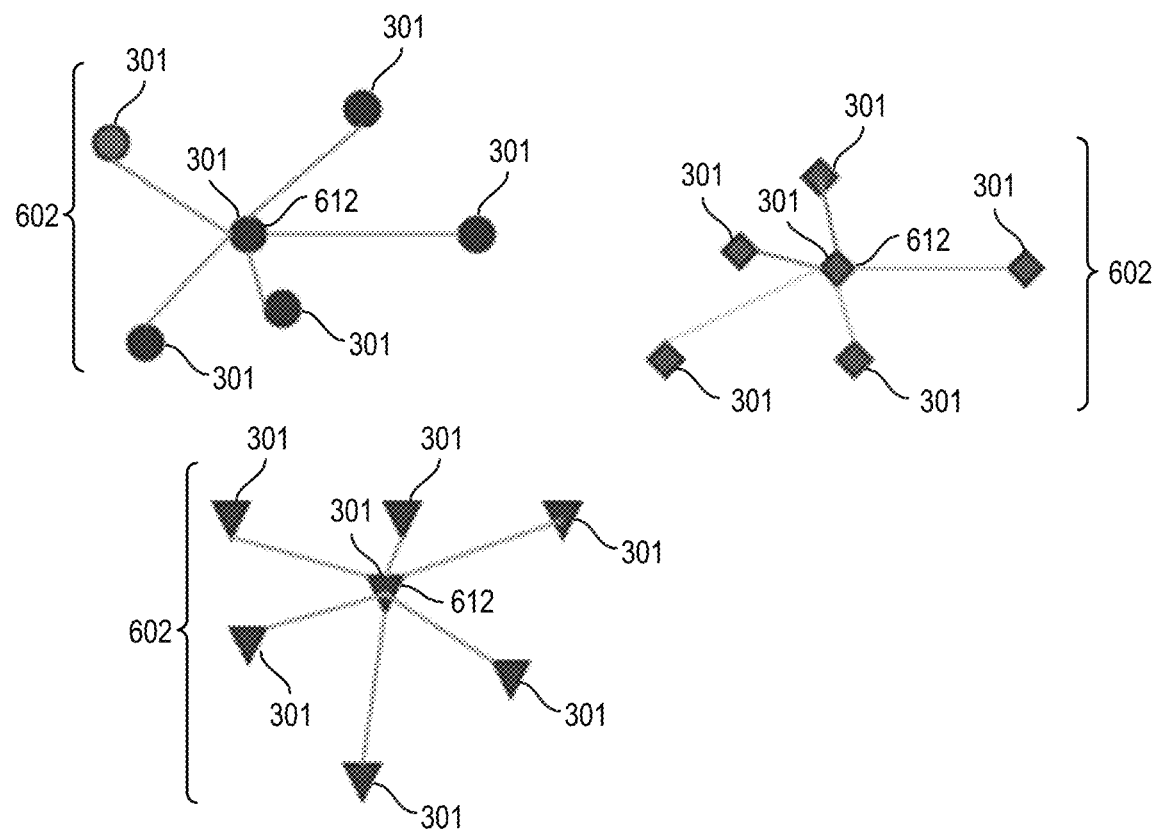
FIG. 6 is a visualization of website clustering, according to an embodiment.

FIG. 6 is a visualization of data points 301 that are clustered together into clusters 602, each cluster 602 having a unique cluster identifier, the clustering due to stronger relative attractiveness of sender and target data points 301, with each data point 301 distance (the edges illustrated in FIG. 6) to other data point 301 represents how similar the data points 301 are, shown in two-dimensional space in an example for two features 211. However, in embodiments disclosed herein, multiple features, in an example eight features 211, can be used, and each data point 301 would be represented as a point in eight-dimensional space with similarity values, calculated using similarity scorer 208, between each other, with clustering and similarity represented in a point in eight-dimensional space to other points in that space.

Once data points 301 are divided into different clusters 602, thresholder 212 can determine a probability score based on a similarity of a data point 301 to its cluster centroid 612.

Thresholder 212 can output, for a data point 301, a cluster identifier associated with the cluster 602 and a probability score (normalized similarity score (from similarity matrix M') between data point 301 and centroid 612 of the cluster 602 that data point 301 is in).

A probability score can give a measure of probability of a data point 301 belonging to assigned to that cluster 602.

A threshold applied by thresholder 212 can be configured to separate data points 301 into two groups: those that formed clusters 602, and remaining data points 301 without strong enough similarity, or that did not cluster by clusterer 210.

Such remaining data points 301 can be considered "weakly clustered", in that there is not high enough similarity score to provide confidence in answer that two data points 301 are from the same attacker.

If the probability score for a data point 301 is greater than or equal to a threshold value, the data point 301 can be labeled with the cluster identifier of its cluster 602.

If the probability score for a data point 301 is below a threshold value, that data point 301 will be treated as a noise point, i.e., not similar enough to any other data points 301 in the data set. A threshold value can be set based on manual analysis for clustering result on a subset of data. In some embodiments, a threshold value may be 0.23. In other embodiments, a threshold value may be 0.45.

A threshold value may be developed based on what is observed in data. In an example, a threshold value can be based on almost a year's worth of data and manual investigation based on experimental work identifying a level of similarity that is strong enough to indicate that two data points belong together. In some embodiments, a threshold value can be a constant value. In other embodiments, the threshold value may be variable.

Any data point 301 that has a probability score or similarity value (normalized similarity score between data point and cluster centroid) of lower than a threshold may be marked as a noise point, i.e., a data point 301 that does not group with any other data points 301.

For data points 301 that failed to satisfy a threshold condition (for example, similarity score is less than a threshold value such data points are weakly clustered and have been removed from those that meet a desired confidence level) during a first iteration, so as to group noise data points 301 among with each other, clustering may be performed again on those data points 301 by clusterer 210 and thresholding performed by thresholder 212 to identify data points 301 from that weakly-similar or weakly-associated set of data points 301 that can cluster with each other more strongly.

A second clustering can follow the same process by clusterer 210, but specifically done on weakly-similar data points 301 that are filtered out by thresholder 212 for being weakly connected, to determine if there any other clusters among the weak data points.

The second clustering can follow the same or different algorithm of clusterer 210, and clustering may be performed on the basis of the same or different features 211.

The second clustering can thus cluster the weakly-similar set of data points 301 into one or more additional clusters 602, each with a newly-associated cluster identifier.

Thresholding can again be performed by thresholder 212 on additional clusters 602. If the probability score for a data point 301 is below a threshold value, in an example, 0.23, that data point 301 will be treated as a noise point. A label such as "Cluster ID −1" may be assigned to represent noise points which cannot be grouped with other data points.

For probability scores greater than or equal to a threshold value, the data point 301 can be labelled with the cluster identifier of its cluster 602.

Conveniently, clustering techniques disclosed herein may be easily verified manually. As human eyes can easily discern complex patterns, efficacy of the technique can be quickly verified manually.

Credential submitter 106 can generate fabricated or fake sign-in credentials, for example, for access to an online banking (OLB), and submit the fabricated credentials to a website 201, which may be a phishing website. Selection of which website 201 to submit to may be based at least in part on clustering and similarities generated by account profiler 200.

In some embodiments, credential submitter 106 takes a phishing URL as input and generates sudo OLB credentials along with PVQ and PI information, it then tries to submit the information by navigating to various pages such as sign-in, PVQ, PI page.

Once sudo credentials are successfully submitted, credential submitter 106 then stores the phishing URL along with submitted credentials in a database, such as data store 110, for use by activity monitor 108 to monitor any online login attempt using the previously submitted fake credentials.

In some embodiments, credential submitter 106 uses information determined by account profiler 200 to identify a suitable website 201 to submit fake credential to, and based on that, generate and submit the fake credentials to the website 201. For example, of websites 201 clustered using account profiler 200, credential submitter 106 may submit fake credentials to only one website 201 of a particular cluster 602, to avoid submitting fake credentials to other clustered website 201 that may be associated with the same attacker or threat actor, so as to not trigger the suspicion of the attacker.

Without input from account profiler 200, identifying websites that are clustered together, fake credentials could be submitted to any number of phishing websites that may or may not be related to one another or associated with the same attacker. However, an attacker might become suspicious if a large percentage of credentials are being received that result in unsuccessful sign-in attempts when the fake credentials are used to attempt access to a legitimate website or OLB. By credential submitter 106 selecting a limited number of websites (in an example, one), from a group of websites clustered by account profiler 200 to submit fake credentials to, risk may be minimized by lowering the overall number of fake credentials being submitted.

Activity monitor 108 can monitor sign-in activity. Activity monitor 108 can be used to capture activity during a sign-in session, including, what page requested, requesting device IP, cookie info, and the like.

If fake credentials previously-submitted by credential submitter 106 are identified as used to log in, such as to an online banking system, activity monitor 108 can identify sign-in activity using those credentials specifically and flags such activity, for example, for a fraud investigation team to act upon. Digital information associated with device used by the attacker (utilizing the fake credentials) may be stored in a database, such as data store 110.

Activity monitor 108 can isolate activity performed using fake credentials, and device fingerprinting may be performed, in an example, by a vendor tool.

Activity monitor 108 can associate a URL of a website 201 with the fake credentials and information generated by account profiler 200 and save as an attacker's profile. Thus it is possible to identify a URL, at which fake credentials were submitted, was then subsequently used by an actor.

The associated phishing URL can also be linked to other information from kit collector 102 and kit analyzer 104 and can be stored in a centralized database such as data store 110.

Figure 7:
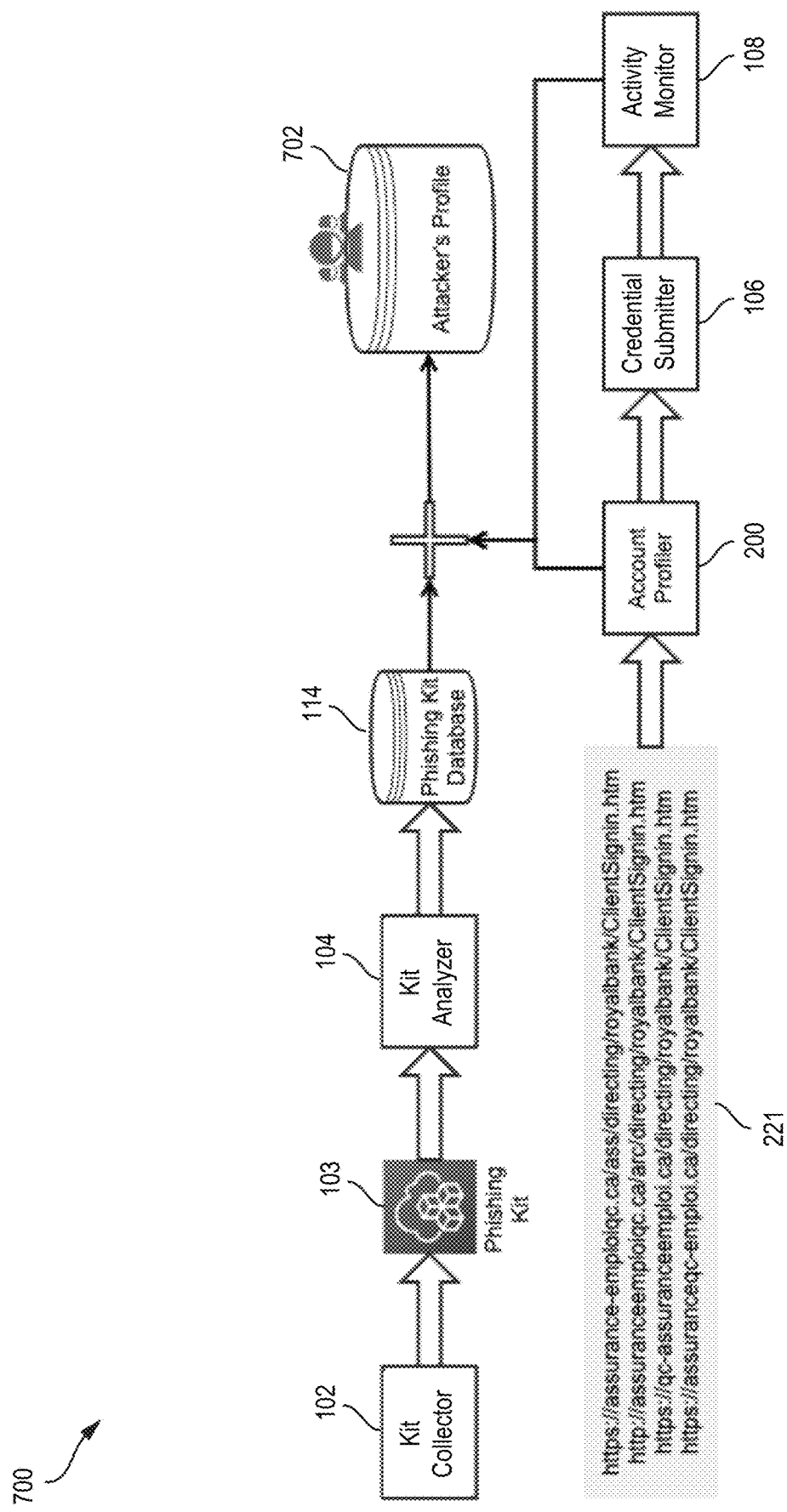
FIG. 7 is a flow chart of a method for digital fingerprinting, according to an embodiment.

FIG. 7 illustrates an embodiment of an end-to-end pipeline of a method 700 for building a digital profile 702 (which may be of a potential attacker or threat actor), for example, using components of system 100 and that can be stored, in an example, in data store 110. The steps are provided for illustrative purposes. Variations of the steps, omission or substitution of various steps, or additional steps may be considered. It should be understood that one or more of the blocks may be performed in a different sequence or in an interleaved or iterative manner.

Upon an attacker or threat actor launching a phishing campaign, method 700 may execute in following sequence to build a profile 702 for the attacker, as illustrated in FIG. 7.

An external vendor, such as RSA, can capture phishing URLs 221 created by an attacker. Kit collector 102 scans URLs 221 provided by the external vendor for open directories for .zip files associated with a phishing kit 103.

Kit analyzer 104 extracts relevant information from phishing kit 103 and stores it in a database such as phishing kit database 114.

Account profiler 200 receives URLs 221 identifying websites 201.

Information about websites 201 can be enriched, by data enricher 202 of account profiler 200, with metadata information, in an example, using external APIs. Such metadata information can form features 211 of websites 201.

Preprocessor 204 and filter 206 of account profiler 200 can perform data cleaning and transformation of websites 201 and associated features 211 to remove less relevant features or websites that may be less relevant.

Similarity scorer 208 of account profiler 200 generates scores between websites 201, represented as data points 301.

Clusterer 210 of account profiler 200 clusters data points 301 together that are predicts as originating from the same attacker or threat actor, and assigned a cluster identifier or attacker identifier.

Credential submitter 106 can submit fake credentials to one URL from each cluster group.

Activity monitor 108 stores a digital fingerprint for the attacker's login attempt using the fake credentials.

Output from account profiler 200 containing attacker identifier can be used to call kit analyzer 104 to obtain corresponding phishing kit information. Digital fingerprint information can be linked to activity information captured by activity monitor 108 based on the fake credentials generated and submitted by credential submitter 106.

Figure 8A:
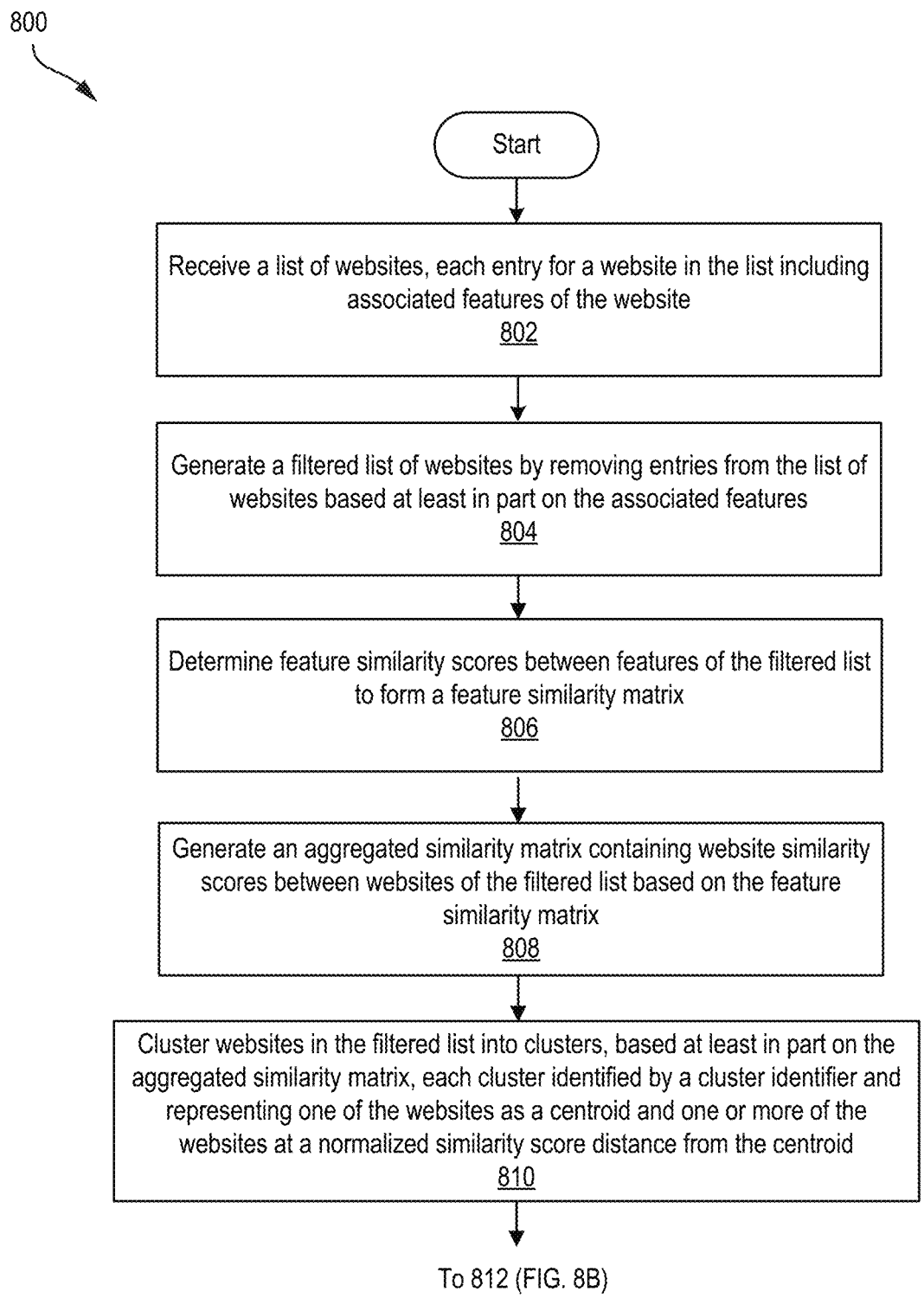
FIGS. 8A-8C illustrate a flow chart of a method for clustering websites, according to an embodiment.
Figure 8B:
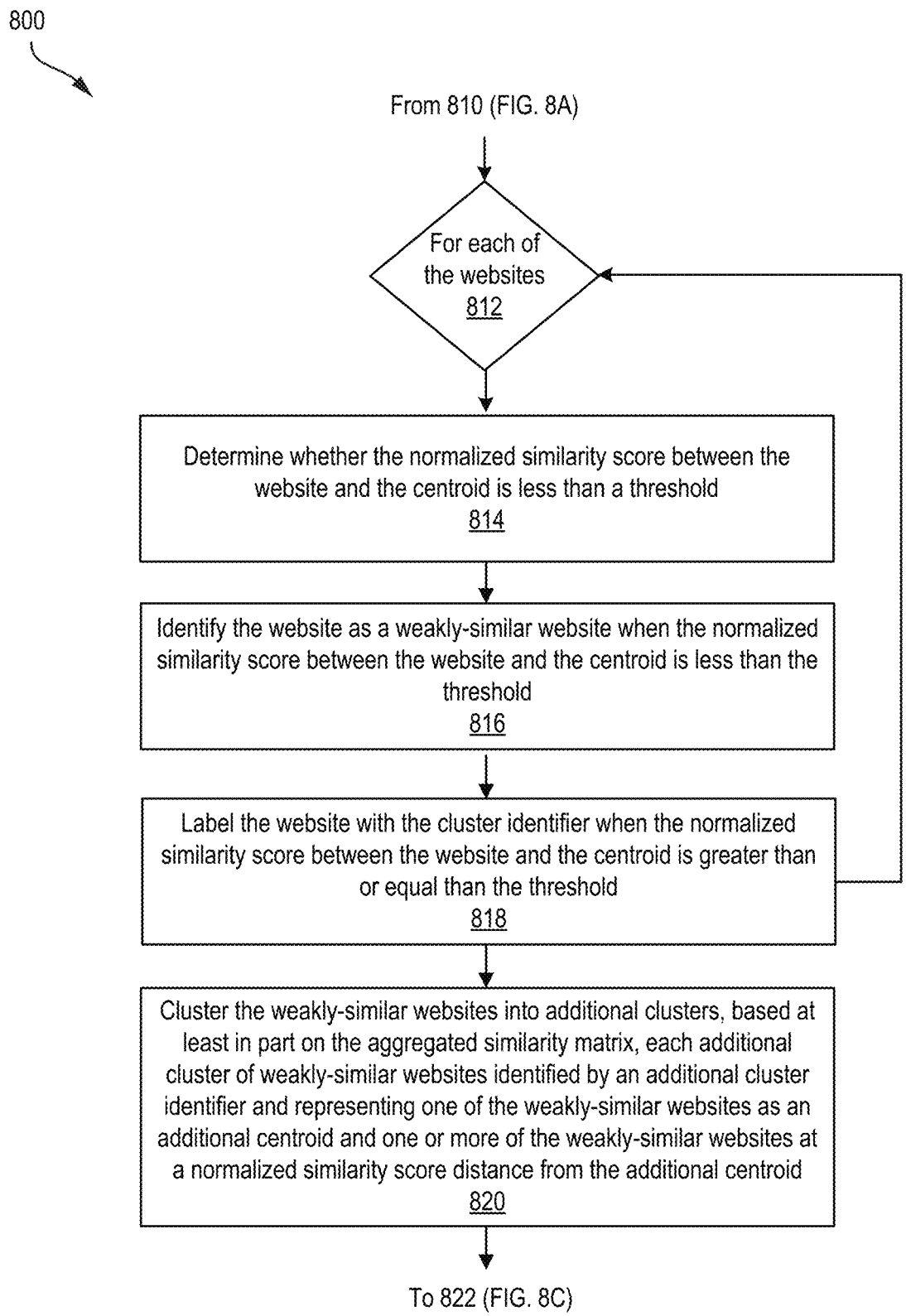
Figure 8C:
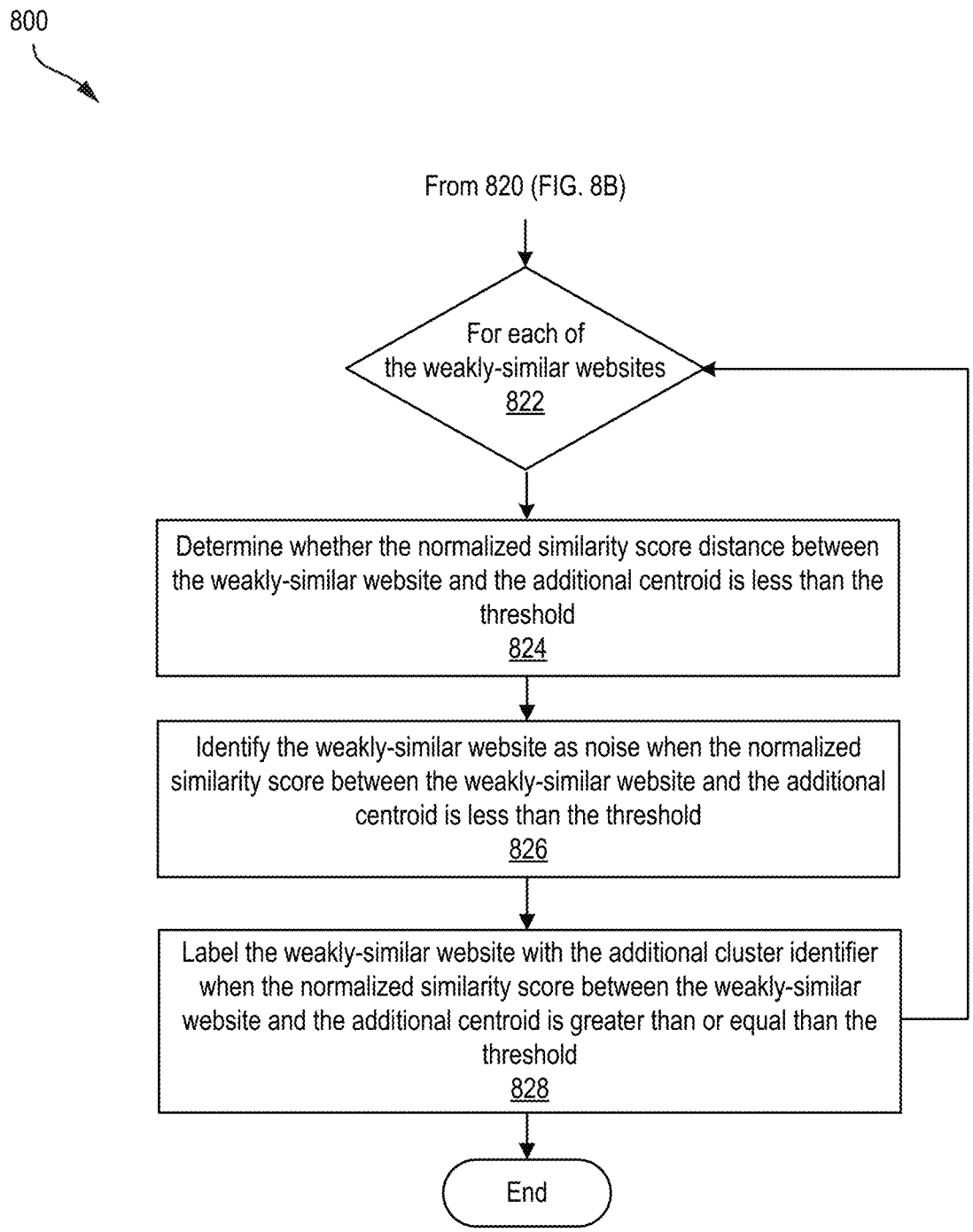

FIGS. 8A-8C illustrate a flow chart of a method 800 of processing input data relating to multiple websites to cluster the websites, according to an embodiment. The steps are provided for illustrative purposes. Variations of the steps, omission or substitution of various steps, or additional steps may be considered.

At block 802, shown in FIG. 8A, account profiler 200 receives a list of websites 201, each entry for a website 201 in the list including associated features 211 of the website 201.

In some embodiments, the associated features 211 for a website 201 include a URL 221.

In some embodiments, additional features for a website are generated, including a domain, a path and a filename based at least in part on the URL 221.

In some embodiments, associated features 211 for a website 201 include a creation date for the website 201.

In some embodiments, the associated features 211 for a website 201 include metadata for the website 201.

In some embodiments, the associated features include one or more of a URL, a registrant name, a registrant phone number, a registrant email, a registrant address, or a registrant organization.

At block 804, filter 206 generates a filtered list of websites 201 by removing entries from the list of websites based at least in part on the associated features 211.

In some embodiments, the filtered list is generated by removing entries from the list of websites having a creation date that is greater than 365 days from a present date.

In some embodiments, predefined features are removed from the filtered list.

At block 806, similarity scorer 208 determines feature similarity scores between features 211 of the filtered list to form a feature similarity matrix M.

In some embodiments, the associated features include categorical features, and the feature similarity scores are based at least in part on an edit distance between the categorical features that is normalized by a length of a larger string.

In some embodiments, the associated features include date features, and the feature similarity scores are based at least in part on a difference in number of days between the date features.

In some embodiments, the associated features include numerical features, and the feature similarity scores are based at least in part on an absolute difference between the numerical features normalized using a standard scaler.

At block 808, similarity scorer 208 generates an aggregated similarity matrix M' containing website similarity scores between websites 201 of the filtered list based on the feature similarity matrix.

In some embodiments, the website similarity scores are based at least in part on a weighted sum of sorted feature similarity scores.

At block 810, clusterer 210 clusters websites 201 in the filtered list into clusters 602, based at least in part on the aggregated similarity matrix, each cluster 602 identified by a cluster identifier and representing one of the websites as a centroid 612 and one or more of the websites at a normalized similarity score distance from the centroid 612.

In some embodiments, clustering is performed based on affinity propagation clustering.

In some embodiments, the affinity propagation clustering represents each website with a data point 301, and a message passing procedure is performed between the data points based on relative attractiveness between data points until a consensus is reached.

Turning to FIG. 8B, at block 812, thresholder 212 determines whether all websites in the filtered list have been evaluated, and blocks 814 to 818 are performed for each of the websites 201.

At block 814, thresholder 212 determines whether the normalized similarity score between the website 201 (represented, in an example, as a data point 301) and the centroid 612 is less than a threshold.

At block 816, thresholder 212 identifies the website 201 as a weakly-similar website when the normalized similarity score between the website 201 and the centroid 612 is less than the threshold.

At block 818, thresholder 212 labels the website 201 with the cluster identifier of cluster 602 when the normalized similarity score between the website 201 and the centroid 612 is greater than or equal than the threshold.

At block 820, clusterer 210 clusters the weakly-similar websites into additional clusters, based at least in part on the aggregated similarity matrix, each additional cluster of weakly-similar websites identified by an additional cluster identifier and representing one of the weakly-similar websites as an additional centroid and one or more of the weakly-similar websites at a normalized similarity score distance from the additional centroid.

Turning to FIG. 8C, at block 822, thresholder 212 determines whether all of the weakly-similar websites have been evaluated, and blocks 824 to 828 are performed for each of the weakly-similar websites.

At block 824, thresholder 212 determines whether the normalized similarity score distance between the weakly-similar website and the additional centroid is less than the threshold.

At block 826, thresholder 212 identifies the weakly-similar website as noise when the normalized similarity score between the weakly-similar website and the additional centroid is less than the threshold.

At block 828, thresholder 212 labels the weakly-similar website with the additional cluster identifier when the normalized similarity score between the weakly-similar website and the additional centroid is greater than or equal than the threshold.

In some embodiments, a website is selected from a cluster identifier, and fabricated credentials generated and submitted to the selected website.

In some embodiments, a sign-event attempt to a legitimate website using the fabricated credentials is detected.

In some embodiments, an attacker identifier of the sign-in attempt is determined and access of sign-in attempts associated with the identifier to the legitimate website blocked.

In some embodiments, an attacker profile is generated based at least in part on the cluster identifier of the selected website, the attacker identifier and phishing kit information associated with a URL of the selected website.

It should be understood that one or more of the blocks may be performed in a different sequence or in an interleaved or iterative manner.

Figure 9:
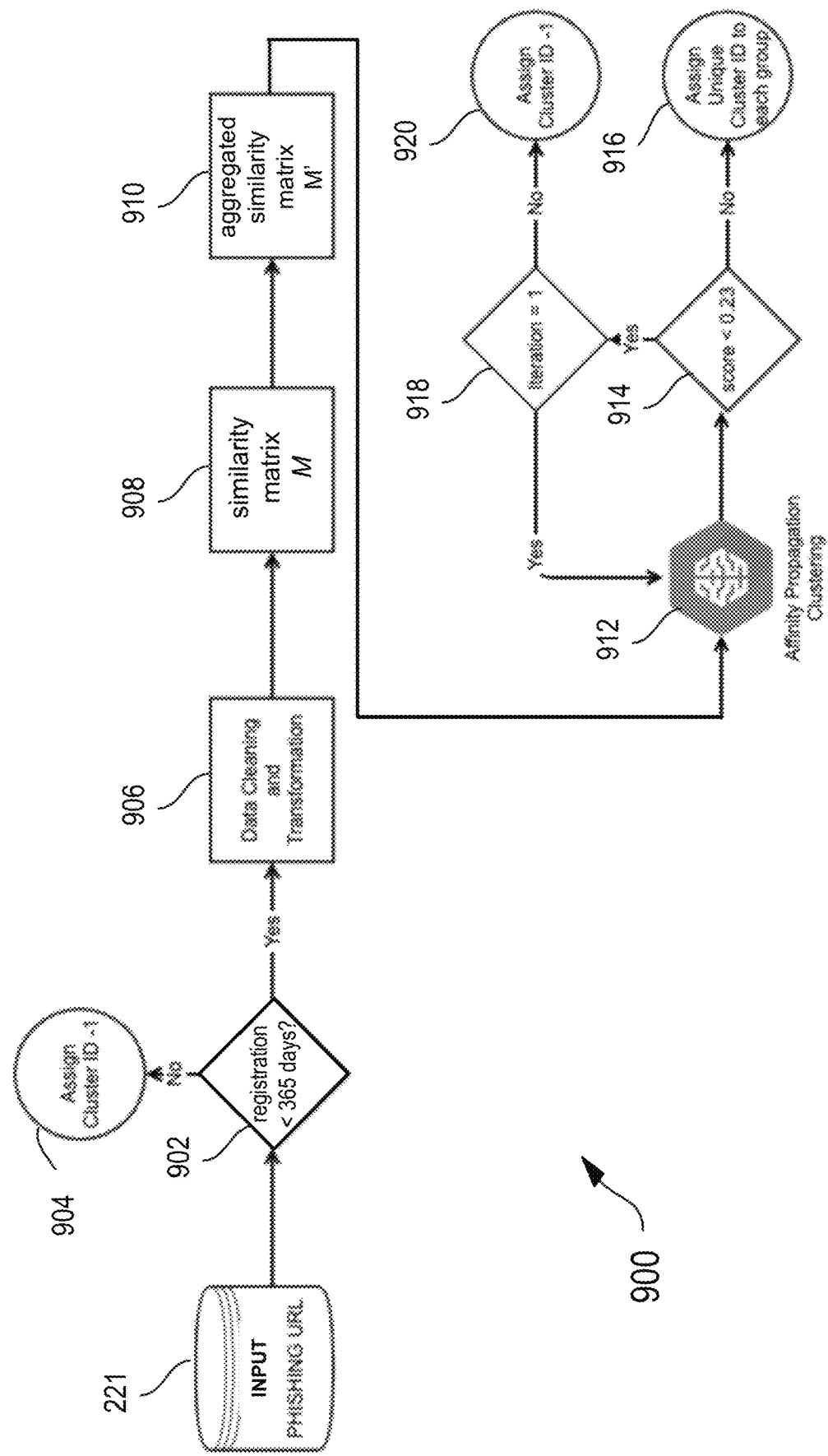
FIG. 9 is a flow chart of a method for clustering websites, according to an embodiment.

FIG. 9 illustrates a method 900 for clustering websites, performed by account profiler 200, in an embodiment. The steps are provided for illustrative purposes. Variations of the steps, omission or substitution of various steps, or additional steps may be considered. It should be understood that one or more of the blocks may be performed in a different sequence or in an interleaved or iterative manner.

Phishing URLs 221 (features 211 of websites 201), are input to account profiler 200. Each website 201 can be represented as a data point 301 having features 211, including a URL 221. At block 902, filter 206 evaluates whether the URLs 221 have been registered for less than 365 days. If a URL 221 has not been registered for less than 365 days, control flow proceeds to block 904, and the URL 221 is assigned a label "Cluster ID −1" as noise. If a URL 221 has been registered for less than 365 days, control flow proceeds to block 906.

At block 906, preprocessor 204 performs data cleaning and transformation. In some embodiments, less relevant features 211 can be removed from data points 301 and features 211 can be split into further particularized features 211, for example URL 221 split into domain, path, and filename.

At block 908, similarity scorer 208 calculates a three-dimensional similarity matrix M for the remaining N data points 301, having dimensions N×N×number_of_features.

At block 910, similarity scorer 208 generates a two-dimensional aggregated similarity matrix M', having dimensions N×N.

At block 912, clusterer 210 performs affinity propagation clustering of data points 301, based at least in part on similarity score values in aggregated similarity matrix M'. Each data point 301 is grouped into a cluster 602 and has a normalized similarity score between that data point 301 and a centroid 612 of the cluster 602.

At block 914, thresholder 212 evaluates, for each data point 301, whether the normalized similarity score to the centroid 612 is less than a threshold, in an example, 0.23. If the normalized similarity score is not less than the threshold, control flow proceeds to block 916. At block 916 the data point 301 is assigned a unique cluster identifier representing the cluster 602 to which it belongs and has a similarity score greater than or equal to the threshold. If the normalized similarity score is less than the threshold, control flow proceeds to block 918.

At block 918, thresholder 212 evaluates the iteration of clustering, namely, the number of times that blocks 912 and 914 have been performed. If the iteration is equal to one, meaning that blocks 912 and 914 have been performed once, control flow returns to block 912, and clusterer 210 performed affinity propagation clustering, only of data points 301 that had a normalized similarity score less than the threshold. The resulting data point clusters are then evaluated at block 914 as to whether the new normalized similarity score is less than 0.23 and control continues to block 916 or 918 as appropriate.

At block 918, if the iteration is not equal to one, control flow proceeds to block 920 and data points 301 having a normalized similarity score less than a threshold are assigned a label as noise, such as "Cluster ID −1".

Figure 10:
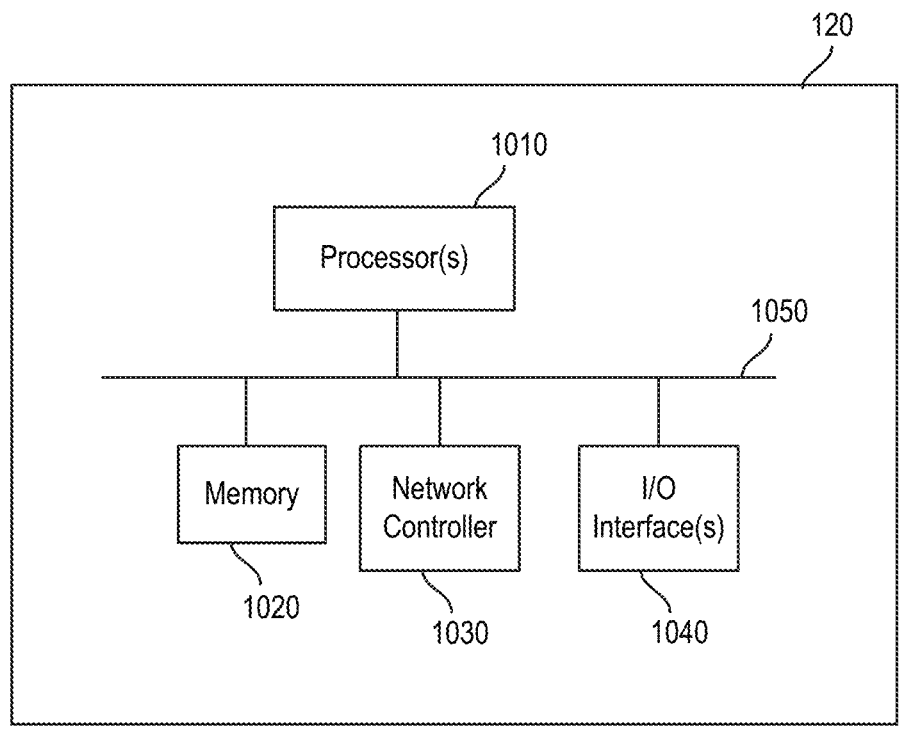
FIG. 10 is a block diagram of example hardware components of a computing device for digital fingerprinting, according to an embodiment.

System 100, in particular, one or more of kit collector 102, kit analyzer 104, account profiler 200 (and components thereof, such as data enricher 202, preprocessor 204, filter 206, similarity scorer 208, clusterer 210 and thresholder 212), credential submitter 106, activity monitor 108 and data store 110, may be implemented as software and/or hardware, for example, in a computing device 120 as illustrated in FIG. 10. Methods 700, 800 and 900, and components thereof, may be performed by software and/or hardware of a computing device such as computing device 120.

As illustrated, computing device 120 includes one or more processor(s) 1010, memory 1020, a network controller 1030, and one or more I/O interfaces 1040 in communication over bus 1050.

Processor(s) 1010 may be one or more Intel x86, Intel x64, AMD x86-64, PowerPC, ARM processors or the like.

Memory 1020 may include random-access memory, read-only memory, or persistent storage such as a hard disk, a solid-state drive or the like. Read-only memory or persistent storage is a computer-readable medium. A computer-readable medium may be organized using a file system, controlled and administered by an operating system governing overall operation of the computing device.

Network controller 1030 serves as a communication device to interconnect the computing device with one or more computer networks such as, for example, a local area network (LAN) or the Internet.

One or more I/O interfaces 1040 may serve to interconnect the computing device with peripheral devices, such as for example, keyboards, mice, video displays, and the like. Such peripheral devices may include a display of device 120. Optionally, network controller 1030 may be accessed via the one or more I/O interfaces.

Software instructions are executed by processor(s) 1010 from a computer-readable medium. For example, software may be loaded into random-access memory from persistent storage of memory 1020 or from one or more devices via I/O interfaces 1040 for execution by one or more processors 1010. As another example, software may be loaded and executed by one or more processors 1010 directly from read-only memory.

Example software components and data stored within memory 1020 of computing device 120 may include software to perform digital fingerprinting, as described herein, and operating system (OS) software allowing for basic communication and application operations related to computing device 120.

Conveniently, aspects of digital fingerprinting as disclosed herein can be implemented to capture a digital profile of an attacker or threat actor, including an identifier, associated phishing URLs and phishing kit, and other features, forming a digital fingerprint that can be stored in a database, and can be utilized, in an example, to prevent future attacks based on phishing efforts.

An objective of digital fingerprinting embodiments may be to generate an active database of attackers targeting customers of an organization by way of phishing attacks. The database can include the following information: an attacker ID—unique ID assigned to each attacker (generated, in an example, by clusterer 210); phishing URLs—list of phishing URLs created by the attacker (retrieved, in an example, from a vendor or third party); phishing kit information—name and other information (such as directory structure, pages, PI and PVQ questions targeted, etc.) for the phishing kit used by the attacker to launch phishing URL (extracted, in an example, by kit analyzer 104); an attacker digital fingerprint—containing information such as device type, IP address, OS version, browser string, cookie information, etc. (determined, in an example, by activity monitor 108 based on "fake" credentials submitted to a phishing URL 201 by credential submitter 106).

Interpreting the results produced by systems and methods described herein, phishing websites may be grouped such that phishing URLs created by same attacker are in the same group.

Embodiments of digital fingerprinting as disclosed herein may be used to identify a digital fingerprint of device, and an IP address of a device used to login to a website or network may be traced.

In some embodiments, a "smart ID" or device identifier can be determined that is unique for a device attempting login, and is an identifier that is unique to a specific device, such as a computing device, a laptop, a mobile computing device, and the like, and may remain static.

Once a device identifier or an IP address is flagged as using fake credentials or associate with an attacker or threat actor, other attempts from that account or identifier can be blocked, and thus login attempts from attackers or threat actors can be blocked.

In another use, embodiments disclosed herein can retrieve information from a phishing kit to be utilized for developing an authentication strategy for telephone verification and other verification channels, for example, by avoiding PVQ and PI questions used in the phishing kit.

Conveniently, this implementation may allow for a targeting of an attacker's creativity in their provided registration information while creating new domains on a daily basis. Also, it may be possible to learn how active each cluster or attacker is.

After applying analysis on the results, it may be possible to address the following questions: how many websites are created by the same attacker per given time; which registrars are the most popular among attackers for phishing domain registration purposes; and what is the campaign trend at given time (Telcos, CRA, etc.).

When researchers interact with phishing sites they may consider visiting one candidate from a group (determined using techniques disclosed herein) in order to preform study or baiting the attacker with false information on the phishing site.

Conveniently, this may help in risk reduction of being detected by the attacker. Conversely, if a researcher or a coder will be visiting multiple sites from a same group in the same manner and leaving the same fingerprint it may increase the risk of being detected.

In addition, systems and methods described herein may bring number of insights about the threat landscape of the organization and can help answer questions about trends and activities of the attackers that actively go after the organization and its clients.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:

1. A computer-implemented method for clustering websites, the method comprising:
    receiving a list of websites, each entry for a website in the list including associated features of the website;
    generating a filtered list of websites by removing entries from the list of websites based at least in part on the associated features;
    determining feature similarity scores between features of the filtered list to form a feature similarity matrix;
    generating an aggregated similarity matrix containing website similarity scores between websites of the filtered list based on the feature similarity matrix;
    clustering websites in the filtered list into first clusters, based at least in part on the aggregated similarity matrix, each first cluster identified by a cluster identifier and representing one of the websites as a centroid and one or more of the websites at a normalized similarity score distance from the centroid;
    for each of the websites:
        determining whether the normalized similarity score between the website and the centroid is less than a threshold;
        identifying the website as a weakly-similar website when the normalized similarity score between the website and the centroid is less than the threshold; and
        labeling the website with the cluster identifier when the normalized similarity score between the website and the centroid is greater than or equal than the threshold;
    clustering the weakly-similar websites into additional clusters, based at least in part on the aggregated similarity matrix used to cluster the websites in the filtered list into the first clusters, each additional cluster of weakly-similar websites identified by an additional cluster identifier and representing one of the weakly-similar websites as an additional centroid and one or more of the weakly-similar websites at a normalized similarity score distance from the additional centroid; and
    for each of the weakly-similar websites:
        determining whether the normalized similarity score distance between the weakly-similar website and the additional centroid is less than the threshold;
        identifying the weakly-similar website as noise when the normalized similarity score between the weakly-similar website and the additional centroid is less than the threshold; and
        labeling the weakly-similar website with the additional cluster identifier when the normalized similarity score between the weakly-similar website and the additional centroid is greater than or equal than the threshold.

2. The method of claim 1, wherein the clustering is performed based on affinity propagation clustering.

3. The method of claim 2, wherein the affinity propagation clustering represents each website with a data point, and a message passing procedure is performed between the data points based on relative attractiveness between data points until a consensus is reached.

4. The method of claim 1, wherein the associated features for a website include a URL.

5. The method of claim 4, further comprising generating additional features for a website including a domain, a path and a filename based at least in part on the URL.

6. The method of claim 1, wherein the associated features for a website include a creation date for the website.

7. The method of claim 6, wherein the filtered list is generated by removing entries from the list of websites having a creation date that is greater than 365 days from a present date.

8. The method of claim 1, wherein the associated features for a website include metadata for the website.

9. The method of claim 1, wherein the associated features include one or more of a URL, a registrant name, a registrant phone number, a registrant email, a registrant address, or a registrant organisation.

10. The method of claim 1, wherein the associated features include categorical features, and the feature similarity scores are based at least in part on an edit distance between the categorical features that is normalized by a length of a larger string.

11. The method of claim 1, wherein the associated features include date features, and the feature similarity scores are based at least in part on a difference in number of days between the date features.

12. The method of claim 1, wherein the associated features include numerical features, and the feature similarity scores are based at least in part on an absolute difference between the numerical features normalized using a standard scaler.

13. The method of claim 1, wherein the website similarity scores are based at least in part on a weighted sum of sorted feature similarity scores.

14. The method of claim 1, further comprising removing predefined features from the filtered list.

15. The method of claim 1, further comprising selecting a website from a cluster identifier, generating fabricated credentials, and submitting the fabricated credentials to the selected website.

16. The method of claim 15, further comprising detecting a sign-event attempt to a legitimate website using the fabricated credentials.

17. The method of claim 16, further comprising determining an attacker identifier of the sign-in attempt and block access of sign-in attempts associated with the identifier to the legitimate website.

18. The method of claim 17, further comprising generating an attacker profile based at least in part on the cluster identifier of the selected website, the attacker identifier and phishing kit information associated with a URL of the selected website.

19. A computer system comprising:
   a processor; and
   a memory in communication with the processor, the memory storing instructions that, when executed by the processor cause the processor to perform the method of claim 1.

20. A non-transitory computer-readable medium having computer executable instructions stored thereon for execution by one or more computing devices, that when executed perform the method of claim 1.

* * * * *